United States Patent [19]
Garg et al.

[11] Patent Number: 5,725,162
[45] Date of Patent: Mar. 10, 1998

[54] FIRING SOL-GEL ALUMINA PARTICLES

[75] Inventors: Ajay K. Garg; Arup K. Khaund, both of Northborough; Lawrence E. Orne, Leominster; Mark R. Young, Boylston, all of Mass.

[73] Assignee: Saint Gobain/Norton Industrial Ceramics Corporation, Worcester, Mass.

[21] Appl. No.: 417,169

[22] Filed: Apr. 5, 1995

[51] Int. Cl.⁶ .................. B02C 19/00; B02C 19/12
[52] U.S. Cl. .................... 241/1; 241/23; 241/27
[58] Field of Search ............... 241/1, 5, 23, 27, 241/2

[56] References Cited

U.S. PATENT DOCUMENTS

| | | | |
|---|---|---|---|
| 3,715,983 | 2/1973 | Rosinski | 241/1 |
| 4,313,737 | 2/1982 | Massey et al. | 241/1 X |
| 4,314,827 | 2/1982 | Leitheiser et al. | 51/298 |
| 4,623,364 | 11/1986 | Cottringer et al. | 51/309 |
| 4,637,908 | 1/1987 | Weingärtner | 264/143 |
| 4,770,671 | 9/1988 | Monroe et al. | 51/293 |
| 4,881,951 | 11/1989 | Wood et al. | 51/309 |
| 5,076,980 | 12/1991 | Nogues et al. | 264/65 |
| 5,190,567 | 3/1993 | Tamamaki et al. | 51/293 |
| 5,413,985 | 5/1995 | Thome et al. | 502/355 |

*Primary Examiner*—John M. Husar
*Attorney, Agent, or Firm*—David Bennett

[57] ABSTRACT

Sol-gel alumina that is dried but unfired can be explosively comminuted by feeding the dried gel into a furnace held at temperatures above those at which vaporizable materials are eliminated from the particles of gel. At suitably elevated temperatures the firing is sufficient to form fully densified alpha alumina particles of a size suitable for direct use as abrasive grits.

21 Claims, 2 Drawing Sheets

FIRING SOL-GEL ALUMINA PARTICLES

BACKGROUND OF THE INVENTION

This invention relates to aluminous abrasive grits and particularly to sol-gel alumina abrasive materials with improved grinding performance.

Sol-gel alumina abrasives are conventionally produced by drying a sol or gel of an alpha alumina precursor, (which is usually but not essentially, boehmite), at about 125° to 200° C. to remove the water component of the gel; breaking up the dried gel into particles of the desired size for abrasive grits; perhaps calcining the particles, (generally at a temperature of from about 400°–800° C.), to form an intermediate form of alumina; and then finally firing the calcined pieces at a temperature sufficiently high to convert them from an intermediate form such as gamma alumina to the alpha alumina form. Simple sol-gel processes are described for example in U.S. Pat. Nos. 4,314,827; 4,518,397; 4,881,951 and British Patent Application 2,099,012.

In a particularly desirable form of sol-gel process, the alpha alumina precursor is "seeded" with a material having the same crystal structure as, and lattice parameters as close as possible to, those of alpha alumina itself. The "seed" is added in as finely divided form as possible and is dispersed uniformly throughout the sol or gel. It can be added ab initio or it can be formed in situ. The function of the seed is to cause the transformation to the alpha form to occur uniformly throughout the precursor at a much lower temperature than is needed in the absence of the seed. This process produces a crystalline structure in which the individual crystals of alpha alumina, (that is those areas of substantially the same crystallographic orientation separated from adjacent crystals by high angle grain boundaries), are very uniform in size and are essentially all sub-micron in diameter. Suitable seeds include alpha alumina itself but also other compounds such as alpha ferric oxide, chromium suboxide, nickel titanate and a plurality of other compounds that have lattice parameters sufficiently similar to those of alpha alumina to be effective to cause the generation of alpha alumina from a precursor at a temperature below that at which the conversion normally occurs in the absence of such seed. Examples of such seeded sol-gel processes are described in U.S. Pat. Nos. 4,623,364; 4,744,802; 4,954,462; 4,964,883; 5,192,339; 5,215,551; 5,219,806 and many others.

The optional calcining of the dried sol-gel is often preferred so as to minimize the time needed at the elevated firing temperatures. This is because the firing operation performs the tasks of converting the transitional alumina forms to the alpha form and the sintering of the alpha alumina to close up residual porosity and ensure that the particles have adequate density and hardness to function well as abrasive grits. It is known that excessive time at sintering temperatures, which are generally between 1300° and 1400° C. for seeded sol-gel materials and about 100° C. higher than that for unseeded sol-gel aluminas, can lead to crystal growth. Since crystal growth is generally regarded as undesirable, it is considered appropriate to carry out the calcining separately and so minimize the time at such elevated temperatures. This procedure is followed in spite of the extra cost of maintaining two high temperature operations.

Since the drying operation is followed by a crushing and screening operation the grain is reduced to room temperature and the heat used to dry the grain is given up to the surroundings. This is of course very inefficient.

The crushing operation is performed after the drying because, at this point the material is relatively easily broken up. If it were left till after the firing operation, the material would be so hard that excessive amounts of energy would be required. It is therefore common-sense to crush at the pre-fired stage. In addition it is considered that firing will be more efficient since the particles will more rapidly reach the firing temperature in the furnace if they are small.

It has now been found possible to significantly reduce the energy consumption involved in the production of alumina by a sol-gel process. This is achieved by a manipulation of the process in a manner that is completely contrary to the intuitive reasoning used in designing conventional processes. The novel process produces alpha alumina particles in a very desirable form that is fully densified and well adapted to use in abrasive applications. Moreover the system is flexible enough to permit design of the abrasive grits obtained.

GENERAL DESCRIPTION OF THE INVENTION

The process of the invention comprises feeding a dried but not fired sol-gel alumina having a volatilizable content of at least 5% by weight, directly into a furnace held at a temperature above 400° C. and controlling the temperature and residence time to produce an explosively comminuted alumina. Under certain conditions when the temperature in the furnace is high enough and the time therein is long enough, the sol-gel alumina can be converted directly to the alpha alumina form and sintered to a density that is at least 95% of the theoretical density.

Sol-gel alumina generally dries to form lumps a few millimeters in size and this is basically dried boehmite, each molecule of which has an associated molecule of water, with perhaps some residual water not completely removed in the drying. In addition advantageous modifiers such as magnesia, yttria, rubidia, caesia, or rare earth or transition metal oxides are often added the sol-gel in the form of their soluble nitrates and these too will contribute volatilizable components, (such as nitrogen oxides), to the dried gel. If an acid such as nitric or acetic acid has been used to peptize the sol-gel there may also be residues of this acid in the dried sol-gel. Generally the dried gel has an overall vaporizable content of from about 5 to about 50%, preferably from about 10 to about 45%, and more preferably from about 20 to about 40% by weight. Drying is usually conducted at a temperature below about 200° C. and more usually at temperatures far lower. For this reason the dried gel contains substantial amounts of vaporizable material when it is charged into the furnace.

While the invention is primarily directed towards the explosive comminution of dried sol-gel materials, these materials can also include other components that do not themselves comprise any volatilizable material. Thus it is possible to include in the sol-gel material components such as alpha or gamma alumina powder, silicon carbide (both particulate and whisker forms), zirconia, cubic boron nitride, and other abrasive materials, providing the overall content of vaporizable material in the dried mixture remains above the 5% by weight material.

When the lumps of dried gel are placed in the furnace the vaporizable material in the lumps expands explosively causing them to fly apart leaving smaller particles which are highly suitable for use in grinding applications. If the residence time in the furnace is sufficiently long, the smaller particles that remain are rapidly converted to the alpha phase and sinter very quickly to the essentially fully densified form. The violent nature of this process has led to it being described familiarly as "explosive comminution" though in a preferred embodiment the process goes beyond comminution and includes firing to the alpha phase and, in some cases sintering to essentially theoretical density. Where the temperature is somewhat lower, the amount of comminution may reduced somewhat and may chiefly result in the break-up of the larger pieces and the creation of weakness lines in the remaining pieces that render them easily broken up in a subsequent comminution operation. This however is also regarded as explosive comminution.

Therefore "explosively comminuted" material is understood to be formed when dried sol-gel alumina particles are fed into the furnace and are at least partially broken into smaller particles without the use of any externally imposed force.

When the furnace residence time is relatively short or the furnace temperature is relatively low, the sintering process and even the conversion to the alpha phase may not be completed when the material exits the furnace. In such event some or all of the particles may be porous to some degree and these relatively loosely consolidated larger particles may be broken up by a light milling operation before being sintered to a density in excess of 95% of theoretical in a separate furnace or by a second passage through the rotary furnace. This is sometimes preferred since a very intense explosive comminution can lead to the production of significant amounts of very fine particles that may be less useful in some abrasive applications. The less severe explosive comminution has the effect of making even apparently unbroken particles very easy to comminute in a subsequent operation. Alternatively and sometimes preferably, the fired material that has not been completely explosively comminuted, which often has a degree of porosity, may be at least partially impregnated with a volatilizable liquid such as water and passed once more through the rotary furnace to complete the comminution process.

Adjustment of the firing conditions to produce a product that is porous as described above also affords the opportunity of impregnating the porous material with solutions of modifying agents such as for example an aqueous solution of a soluble salt of magnesium, yttriium, a transition element, rubidium, caesium or a rare earth metal. On sintering these materials will usually generate the modifying oxide in a very effective form and simultaneously generate further amounts of volatilizable material that can be used to bring about explosive comminution.

Abrasive grain prepared in the above way often has an unexpectedly better grinding performance than grain obtained by more conventional processes. It is theorized that this may be because the comminution technique does not impose physical strains on the material of the type that could give rise to defects in the abrasive grit structure. Regardless of theory this performance improvement is surprising and significant.

DRAWINGS

DETAILED DESCRIPTION OF THE INVENTION

Figure 1:
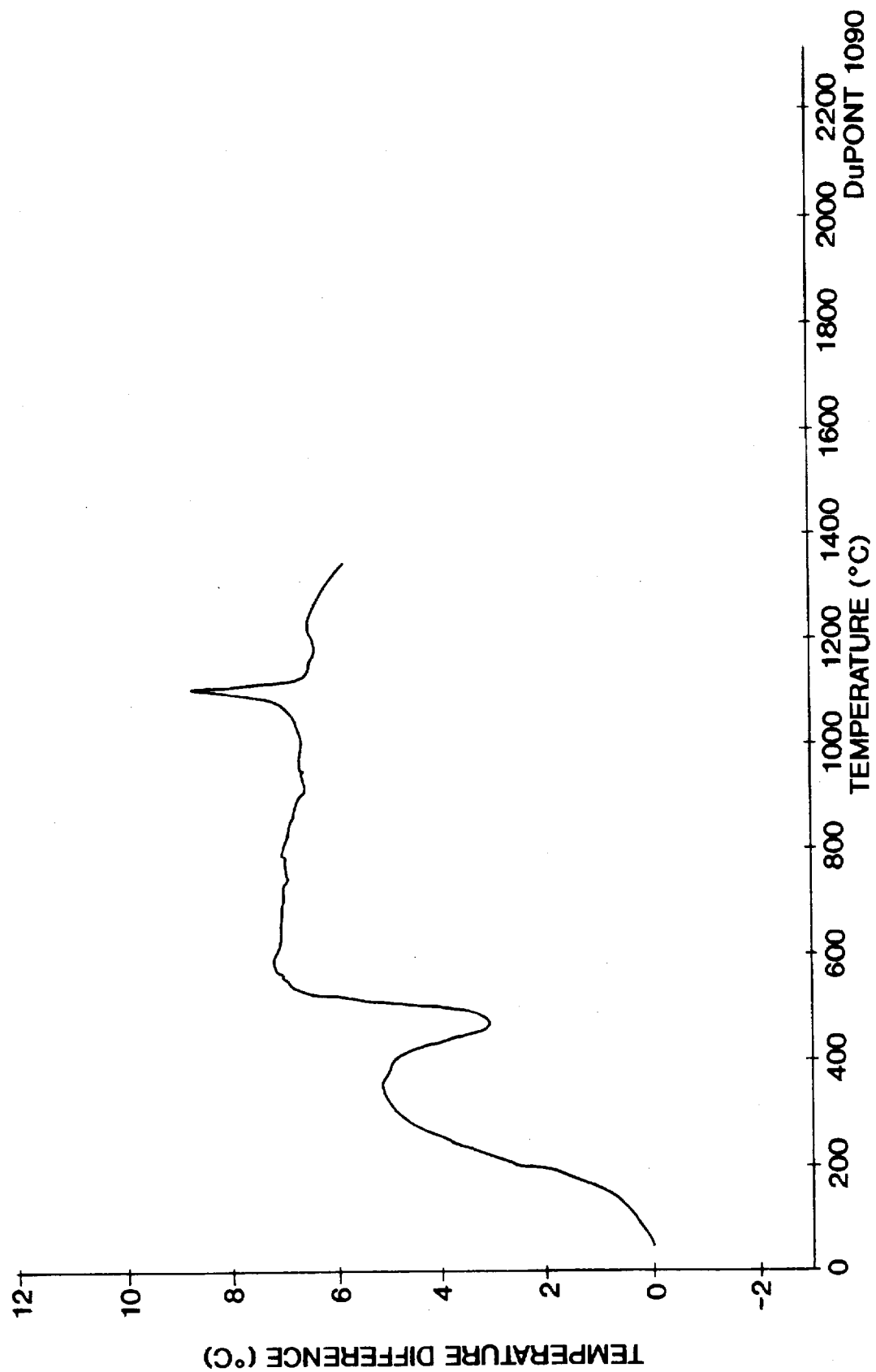
FIG. 1 shows a DTA trace of a seeded sol-gel alumina.

From the drawing presented as FIG. 1, which is a Differential Thermal Analysis trace following a seeded sol-gel as its temperature is raised, it will be seen that there is an endotherm at about 400° C. This indicates the loss of volatiles including water and acid and salt decomposition products. It is this loss of volatiles that causes the explosive comminution. Clearly the faster this loss occurs, the more explosive the decomposition will be. By about 600° C. the amount of volatiles to be removed has significantly diminished and conversion to the anhydrous phases of alumina such as gamma alumina is complete. At higher temperatures still, the conversion to the alpha phase begins. With seeded sol-gel materials, this occurs at about 1150° C. or even lower. This is indicated by the peak in FIG. 1. In an unseeded sol-gel, the trace will be very similar except that the alpha conversion peak will occur at a rather higher temperature, perhaps 1250° C. or so.

To practice the invention it is only necessary to heat at a temperature at which the volatiles begin to be driven off. Clearly higher temperatures than the minimum favor a very rapid decomposition that has the maximum explosive effect. However if the heating is sufficiently rapid even modest temperatures at the lower end of the above ranges can be used effectively.

If temperatures at the lower end of the above ranges, (that is where alpha alumina has still not been formed), are used, the explosively comminuted material must be subjected to a further firing operation to complete the conversion to the alpha phase and (if desired) sinter the material to essentially theoretical density, (generally taken to be in excess of 95%). While this involves further expense, it does allow the use of rotary furnace materials that are much more sturdy and far less expensive that the silicon carbide tubes that are standard for furnaces in which all operations are performed at the same time.

The sol-gel alumina is typically dried at temperatures below about 200° C. and more preferably at much lower temperatures such as from about 75 to about 175° C.

Figure 2:
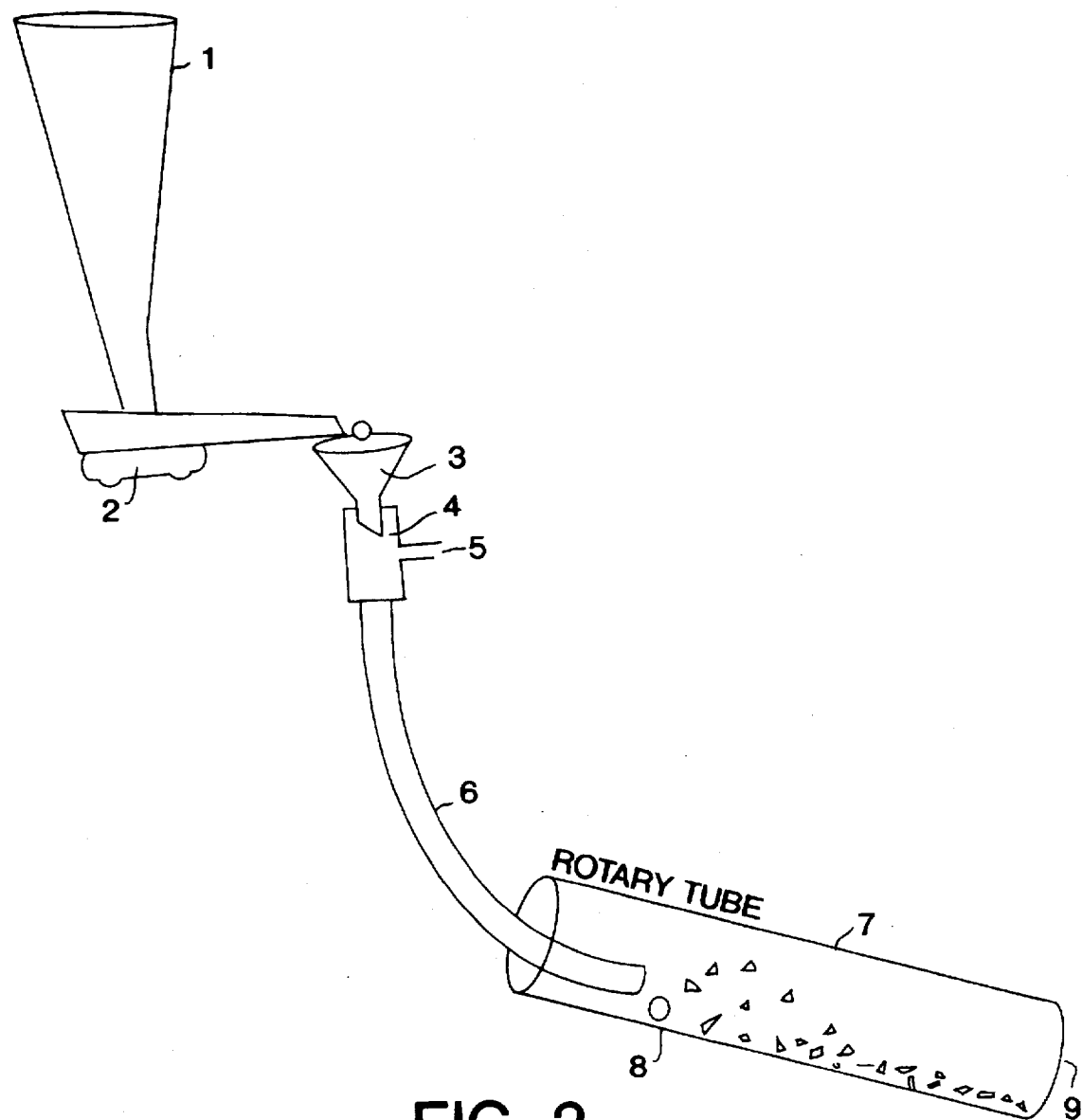
FIG. 2 shows a simplified elevation of an apparatus adapted for the implementation of one embodiment of the process of the invention.

As has been indicated above, it is highly desirable to provide that the large particles of dried sol-gel material are heated as rapidly as possible to achieve the maximum expansion and explosive comminution. The apparatus illustrated in simplified elevation and partial cross-section in FIG. 2 is well suited to meet these requirements. Uncrushed dried particles of a sol-gel alumina about 0.5 to about 1 cm in diameter are fed into the hopper, 1, from which they are fed through a vibratory feeder, 2, to a secondary feeder, 3. This secondary feeder discharges particles into an air eductor, 4, which in turn accelerates the particles using a stream of compressed air entering through port, 5, which carries the particles through a conduit, 6, and into a rotary furnace, 7, having upper and lower ends, at a point, 8, adjacent the hot zone within the furnace. In use the particles explode when they enter the hot zone and comminuted particles exit the lower end, 9, of the furnace.

In an explosive comminution process the heating of the lumps of dried gel is preferably done rapidly to achieve the maximum explosive effect. While several furnace designs other than that illustrated in FIG. 2 could be adapted to meet this requirement, a highly suitable furnace for carrying out the process is a rotary furnace comprising a tube inclined at an angle to the horizontal and rotating about its axis, said tube being heated by externally applied heat. The rotation of the tube ensures that the lumps or particles inside the tube are in constant movement such that no one part of a lump or particle is heated by contact with the tube to the exclusion of another part. The speed of rotation and the angle of incline of the tube determine the residence time inside the furnace.

These parameters are preferably adjusted to ensure that the evaporation of the vaporizable materials from inside the lumps happens rapidly rather than gradually. This is to enable the particles formed after the explosive breakup of the lumps to spend the maximum time firing and densifying.

Other furnace designs can be used as desired including batch furnaces optionally with fluidized beds and furnaces with microwave or induction heating.

A rotary furnace for use with firing temperatures of the order of those needed to sinter alumina conveniently has a silicon carbide tube. This is because of its ability to stand up to the. physical demands of the process including the temperature variations along the length and the different loads at different point along the tube length. Silicon carbide is also able to withstand any acidic gases that might be generated, for example as nitrate residues are eliminated. If however it is intended to carry out the explosive comminution and conversion to the alpha form at temperatures below those at which full sintering occurs, it is possible to use metal alloys capable of withstanding temperatures of up to about 1200° C. such as "Inconel".

Using a rotary furnace, the process of the invention requires a residence time in the hot zone of from about 1 second to about 30 minutes and preferably from about 2 seconds to about 20 minutes. To achieve such residence times the angle of elevation of the tube is preferably from about 1° to about 60° and more preferably from about 3° to about 20° and the speed of rotation is preferably about 0.5 to about 20 rpm and more preferably from about 1 to about 15 rpm.

When firing a seeded sol-gel alumina the firing temperature in the hot zone of a rotary furnace is usually from about 400° C. to about 1500° C. and more preferably from about 600° C. to about 1400° C. For an unseeded sol-gel alumina the hot zone is preferably maintained at a temperature of from about 400° C. to about 1650° C. and more preferably from about 600° C. to about 1550° C.

The particles obtained by the explosive comminution process of the invention tend to have pronounced aspect ratios, that is, they have one dimension that is substantially longer than any other. Such particles are particularly useful in coated abrasive applications.

The process of the invention is applicable to all types of sol-gel particle production particularly where these are intended for abrasive applications. The sol-gel can be seeded or unseeded, the only difference in the conditions used is that a higher sintering temperature is generally required when the sol-gel is unseeded.

Because the process of the invention permits the elimination of the physical comminution stage typical of the prior art, the dried gel can be fed directly into the furnace from the drier. This saves considerable time and energy costs.

DESCRIPTION OF PREFERRED EMBODIMENTS

The process of the present invention is now described with particular reference to the firing of a seeded sol-gel alumina in a rotary furnace. These examples are for the sake of illustration only and are intended to imply no essential limitations on the essential scope of the invention.

Example 1

A Ross mixer was charged with 74,657 gm of deionized water and a slurry of alpha alumina seeds having a BET surface area of about 120m$^2$/gm made by adding 6,000 gm of a 6% slurry of the seeds in deionized water to 10,000 gm of deionized water. Boehmite, ("Disperal" sold under that trademark by Condea GmbH), in an amount of 36.00 kg was also added and the mix was evacuated and agitated for 5 minutes. A solution of 1,671 gm of 70% nitric acid in 5,014 gm of deionized water was then added while the stirred mixture was maintained under vacuum and stirred for a further 5 to 10 minutes. The vacuum was then released and the mixture was gelled by passing the mixture through an in-line mixer-homogenizer while injecting into the mixture a solution of 1,671 gm of 70% nitric acid in 5,014 gm of deionized water.

The gel was dried and broken up into lumps of from about. 0.25cm to 1 cm in size and these lumps were fed into a furnace. The dried sol-gel lumps were fed directly into a rotary furnace comprising a silicon carbide tube 213 cm in length and 15 cm in diameter, with a 50 cm hot zone maintained at 1405° C. The tube was inclined at 6° to the horizontal and rotated at about 18 rpm.

The lumps were explosively comminuted to a range of particle 20 sizes from which 50 T sized grits were separated for physical testing. The time for the material fired to transit the rotary furnace was about 1 to 2 minutes. The fired grits had a density in excess of 3.8 gm/cc and comprised microcrystallites of alumina about 0.2 micron in diameter.

For the sake of comparison the same sol-gel formulation was dried in the same way, roll-crushed to produce -24 mesh particles which were then calcined at about 800° C. before being fired in a conventional manner in a conventional rotary furnace.

The two samples were then made up into abrasive belts using exactly the same amounts of grit, backing, maker and size coats. Each belt carried 590 gm of grit per square meter of surface area and was 6.4 cm wide and 152.4 cm long. The belts were run at 9,000 surface meters per minute and were used to cut a 304 stainless steel bar for 4 minutes under a water coolant at an applied force of 6.8 kg.

The belt made using the conventional grits cut 74 g during this period while the belt made with the explosively crushed grits cut 94 g, or a 27% improvement over the conventional belt.

Example 2

Dried lumps of seeded sol-gel alumina at room temperature with a size of about +24T were fed directly at a rate of about 2.25 to about 4.5 kg/hour into the hot zone of a rotary furnace maintained at 1000° C. using an apparatus substantially as described in FIG. 2. The furnace was the same as was used in Example 1 except that the tube was rotated at about 10 rpm and was inclined at about 7° to the horizontal. The gel particles were explosively comminuted in the furnace and the particle size distribution was as described in Table 5 below.

TABLE 1

| SIZE RANGE | AMOUNT IN RANGE |
| --- | --- |
| +30 | 41% |
| −30 + 40 | 31% |
| −40 + 50 | 11% |
| −50 + 60 | 3% |
| −60 | 4% |

In a separate operation the above explosively comminuted material was further sintered to a density greater than 3.8 gm/cc and the size range of the sintered material was as shown in Table 2 below.

TABLE 2

| SIZE RANGE | AMOUNT IN RANGE |
|---|---|
| +30 | 22% |
| −30 +40 | 38% |
| −40 +50 | 23% |
| −50 +60 | 9% |
| −60 | 8% |

What is claimed is:

1. A process for explosively comminuting a composition comprising a dried but unfired sol-gel alumina said composition having a volatilizable content of at least 5% by weight, which comprises feeding particles of the composition directly into a furnace held at a temperature from about 400° C. to 1600° C. and controlling the residence time in the furnace to produce explosively comminuted alumina particles.

2. A process according to claim 1 in which the furnace is a tubular rotary furnace.

3. A process according to claim 2 in which the tube is inclined at an angle of from 1 to about 60° to the horizontal.

4. A process according to claim 3 in which the tube is rotated at from about 0.5 to about 40 rpm.

5. A process according to claim 1 in which the residence time in the zone of maximum temperature in the furnace, (the hot zone), is from about 1 second to about 30 minutes.

6. A process according to claim 1 in which the dried sol-gel alumina containing composition fed into the furnace comprises from about 5 to about 60% by weight of volatilizable material.

7. A process according to claim 1 in which the dried sol-gel alumina containing composition is fed directly into the vicinity of the hot zone of the furnace.

8. A process according to claim 1 in which the temperature and residence time in the furnace are sufficient to form the alpha phase and sinter to a density of at least 95% of theoretical.

9. A process according to claim 1 in which the furnace is maintained below the temperature required to sinter the alumina, and the explosively comminuted material is subsequently sintered to essentially theoretical density.

10. A process according to claim 9 in which the explosively comminuted material is subjected to a crushing process to adjust the particle size further before it is sintered.

11. A process according to claim 9 in which the explosively comminuted material is treated with a solution of a soluble salt of a metal selected from the group consisting of rare earth metals, transition metals, rubidium, caesium and yttrium before being subjected to the sintering operation.

12. A process for explosively comminuting a composition comprising a dried but unfired seeded sol-gel alumina, said composition comprising from about 20 to about 40% by weight of volatilizable material which comprises feeding the composition into a tubular rotary furnace having a hot zone maintained at a temperature of from about 600° C. to about 1500° C. in which the tube is inclined at an angle of from about 2° to about 20° to the horizontal and rotated at from about 2 to about 20 rpm.

13. A process according to claim 12 in which the temperature and residence time in the furnace are sufficient to form the alpha phase and sinter to a density of at least 95% of theoretical.

14. A process according to claim 12 in which the furnace is maintained below the temperature required to sinter the alumina, and the explosively comminuted material is subsequently sintered to essentially theoretical density.

15. A process according to claim 14 in which the explosively comminuted material is subjected to a milling process to adjust the particle size further before it is sintered.

16. A process according to claim 14 in which the explosively comminuted material is treated with a solution of a soluble salt of a metal selected from the group consisting of rare earth metals, transition metals, rubidium, caesium and yttrium before being subjected to the sintering operation.

17. A process for explosively comminuting a dried but unfired unseeded sol-gel alumina comprising from about 20 to about 40% of volatilizable material which comprises feeding the dried. sol-gel into a tubular rotary furnace having a hot zone maintained at a temperature of from about 600° C. to about 1650° C. in which the tube is inclined at an angle of from about 3° to about 20° to the horizontal and rotated at from about 1 to about 20 rpm.

18. A process according to claim 17 in which the temperature and residence time in the furnace are sufficient to form the alpha phase and sinter to a density of at least 95% of theoretical.

19. A process according to claim 17 in which the furnace is maintained below the temperature required to sinter the alumina, and the explosively comminuted is subsequently sintered to essentially theoretical density.

20. A process according to claim 19 in which the explosively comminuted material is subjected to a milling process to adjust the particle size further before it is sintered.

21. A process according to claim 19 in which the explosively comminuted material is treated with a solution of a soluble salt of a metal selected from the group consisting of rare earth metals, transition metals, rubidium, caesium and yttrium before being subjected to the sintering operation.

* * * * *